United States Patent [19]

Yashima et al.

[11] Patent Number: 4,565,909

[45] Date of Patent: Jan. 21, 1986

[54] HANDLE SWITCH ASSEMBLY FOR A MOTOR VEHICLE

[75] Inventors: Michio Yashima, Kawagoe; Masami Takanashi, Yokohama; Akihiro Komatsu, Tokyo, all of Japan

[73] Assignee: Honda Kogyo Kabushiki Kaisha, Tokyo, Japan

[21] Appl. No.: 501,882

[22] Filed: Jun. 7, 1983

[30] Foreign Application Priority Data

| Jun. 9, 1982 | [JP] | Japan | 57-98938 |
| Jun. 11, 1982 | [JP] | Japan | 57-87712[U] |
| Jun. 11, 1982 | [JP] | Japan | 57-87713[U] |
| Jun. 11, 1982 | [JP] | Japan | 57-87714[U] |
| Jun. 11, 1982 | [JP] | Japan | 57-87715[U] |
| Jun. 11, 1982 | [JP] | Japan | 57-87716[U] |

[51] Int. Cl.⁴ .................................................. H01H 9/06
[52] U.S. Cl. .................................................. 200/61.85
[58] Field of Search ............... 200/52 R, 61.54–61.57, 200/61.85, 157

[56] References Cited

U.S. PATENT DOCUMENTS

| 1,675,847 | 7/1928 | Fisher | 200/61.54 X |
| 2,025,981 | 12/1935 | Getty | 200/61.57 |
| 4,131,772 | 12/1978 | Weckenmann et al. | 200/61.54 |
| 4,213,513 | 7/1980 | Beck | 200/61.85 |
| 4,421,960 | 12/1983 | Arima et al. | 200/61.54 |
| 4,455,463 | 6/1984 | Röhl | 200/61.85 |

FOREIGN PATENT DOCUMENTS

2932238 2/1981 Fed. Rep. of Germany ... 200/61.85

Primary Examiner—J. R. Scott
Attorney, Agent, or Firm—Birch, Stewart, Kolasch & Birch

[57] ABSTRACT

A handle switch assembly for a motor vehicle having a bar-like handle member with a handle grip, on which the switch assembly is mounted, comprises a pair of elongated members to be combined with each other to form the bar-like handle, and respectively provided with a bent portion to form a cavity portion and switch elements disposed in the cavity portion. Push buttons or switch knobs for the switch elements are disposed in a control section which is provided at the cavity portion of the elongated members so as to be on or behind an imaginary plane which includes a rear end of a cylindrical surface of the handle grip, whereby to provide an easy access to the push buttons or switch knobs.

7 Claims, 11 Drawing Figures

HANDLE SWITCH ASSEMBLY FOR A MOTOR VEHICLE

BACKGROUND OF THE INVENTION

1. Field of the Invention

The present invention relates to a switch assembly for a motor vehicle, and more particular to a handle switch assembly to be used in a motor vehicle having a bar-like handle member such as a motorcycle.

2. Description of Background Information

In a motor vehicle such as a motorcycle, various control switches such as a turn signal switch are provided on a handle bar, generally, adjacent to a handle grip. In order to mount a plurality of switches on a handle pipe (a tubular member of the handle bar), a switch housing having a front or control panel at a rear end thereof (with respect to the forward movement of the motor vehicle) has been used in conventional arrangements.

However, there were several disadvantages relating to the switch arrangement due to structural restrictions of the switch housing mounted on the handle pipe. For example, it was not easy to arrange the switches especially at the central portion of the switch housing because the space between the handle pipe and the front panel of the switch housing is rather small. Further, the operation of the switches was often not easy because there was a considerable level difference between the control panel of the switch housing and the level of the rear face of the handle grip.

SUMMARY OF THE INVENTION

An object of the present invention is therefore to provide a handle switch assembly for a motor vehicle which has a construction suited for mounting a plurality of switch elements at desired positions regardless of a structural limitation of the conventional arrangement.

Another object of the present invention is to provide a handle switch assembly for a motor vehicle in which the facility of the operation of the switch is greatly improved by arranging the switch knobs at proper positions with respect to a handle grip which is located adjacent thereto.

A further object of the present invention is to provide a handle switch assembly for a motor vehicle which has an improved appearance as compared with the conventional switch assembly.

A still further object of the present invention is to provide a handle grip for a motor vehicle which has a form for allowing an easy operation of the switch assembly provided adjacent thereto.

According to the present invention, a handle switch assembly for a motor vehicle having a bar-like handle member, comprises at least one switch element housed in a cavity portion formed in the handle member adjacent to a handle grip mounted on the handle member.

According to another aspect of the invention, the handle member comprises a pair of elongated members to be combined with each other, and having a first end to be fixed to a front fork of the motor vehicle and a second end on which the handle grip is mounted, and the elongated members respectively provided with a bent portion to form the cavity portion when the elongated members are combined with each other.

According to a further aspect of the present invention, the elongated members take the form of a first elongated plate having an upwardly bent portion and a second elongated plate having a downwardly bent portion.

According to still another aspect of the invention, a handle switch assembly further comprises at least one housing member to be mounted on the elongated members at a position of the bent portion, having a form for defining a space for housing at least one switch element, between a wall surface thereof and the bent portion of the elongated members.

According to still further aspect of the invention, the housing member is provided with a control surface section in which a plurality of switch operating members for the switch elements in the cavity portion and in the space are altogether disposed.

According to further aspect of the invention, the control surface section is disposed on or behind an imaginary plane including a rear end of a cylindrical surface of the handle grip with respect to a direction of forward movement of the motor vehicle.

According to another aspect of the invention, the switch elements are disposed in the cavity portion and in the space in a manner that a head portion of the switch operating member is positioned on or behind the imaginary plane when the switch element is actuated by means of the switch operating member.

According to a further aspect of the invention, the switch elements are disposed in a manner so that the head portion of the switch operating member is positioned on or behind of the imaginary plane when the switch elements are in released positions.

According to a further aspect of the invention, a handle grip for a motor vehicle having a bar-like handle member carrying a switch assembly, comprising a cylindrical body mounted on the handle member, a flange portion formed at an end of the cylindrical body adjacent to the switch assembly, the flange portion being provided with a cut off portion at a position between the switch assembly and the cylindrical body, whereby to provide an easy access to the switch assembly.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the following description taken in conjunction with the accompanying drawings which are given by way of illustration only, and thus are not limitative of the present invention, and wherein.

DETAILED DESCRIPTION OF THE PREFERRED EMBODIMENTS

Figure 1:
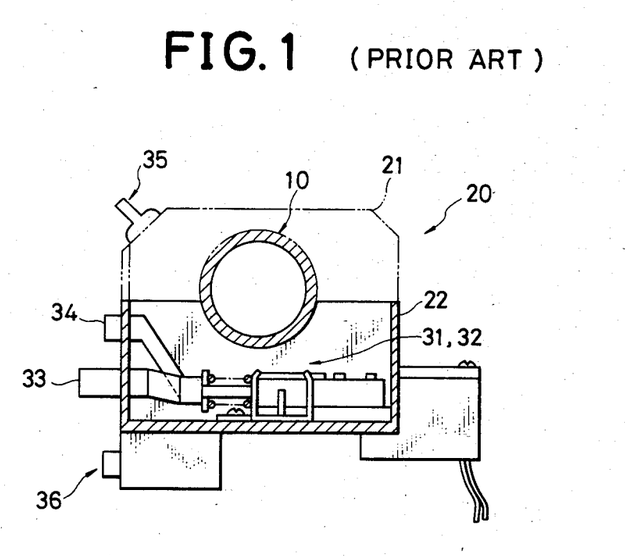
FIG. 1 is a cross sectional view of a handle switch assembly of a conventional arrangement, on a plane perpendicular to an axis of a handle pipe.

Before entering into the explanation of preferred embodiments of the present invention, reference is first made to FIG. 1, in which an example of a conventional handle switch assembly is illustrated.

As shown in FIG. 1, a switch housing generally designated by 20 is mounted on a handle pipe 10 and is used for housing two switch elements 31 and 32 which are arranged in parallel relation with each other. The switch housing 20 consists of an upper piece 21 and a lower piece 22 each having a pair of semicircular recesses in both of side walls thereof. With this arrangement, circular openings for a handle pipe are formed in the side walls when the upper and the lower pieces 21 and 22 are fixed together. The switch elements 31 and 32 are fixed at the bottom of the lower piece 22, and respectively provided with a switch operating member 33 or 34 which projects from a control panel at the rear side of the switch housing with respect to the direction of the movement of the motorcycle of the switch housing 20. In order to place a push end of the switch operating member 34 at a substantially central position of the control face of the switch housing 20, the switch operating member 34 is formed into a folded shape as shown in FIG. 1. Therefore, the switch operating member 34 is subjected to an upward bending moment when pushed at the push end thereof, and therefore it is necessary to make this switch operating member sufficiently large in order to secure enough rigidity. Because of the reason described above, the switch housing of the conventional type tends to be considerably large, especially when a plurality of switch elements are housed therein. For this reason, there were disadvantages, in the case of the conventional arrangement, in that the cost of the production of the switch assembly is considerably high and in that the handling of those switches is rather awkward because there is a considerable difference between the level of the switch button and the level of the handle grip. Furthermore, in the case of the switch assembly shown in FIG. 1, a lighting switch 35 and a horn switch 36 are also provided on and outside of the switch housing 20. However, this type of arrangement is also inconvenient in that the arrangement requires additional switch housings or brackets. Moreover, this arrangement is disadvantageous because the operation of the switches is rather uncomfortable and it mars the beauty of the switch assembly.

Figure 2:
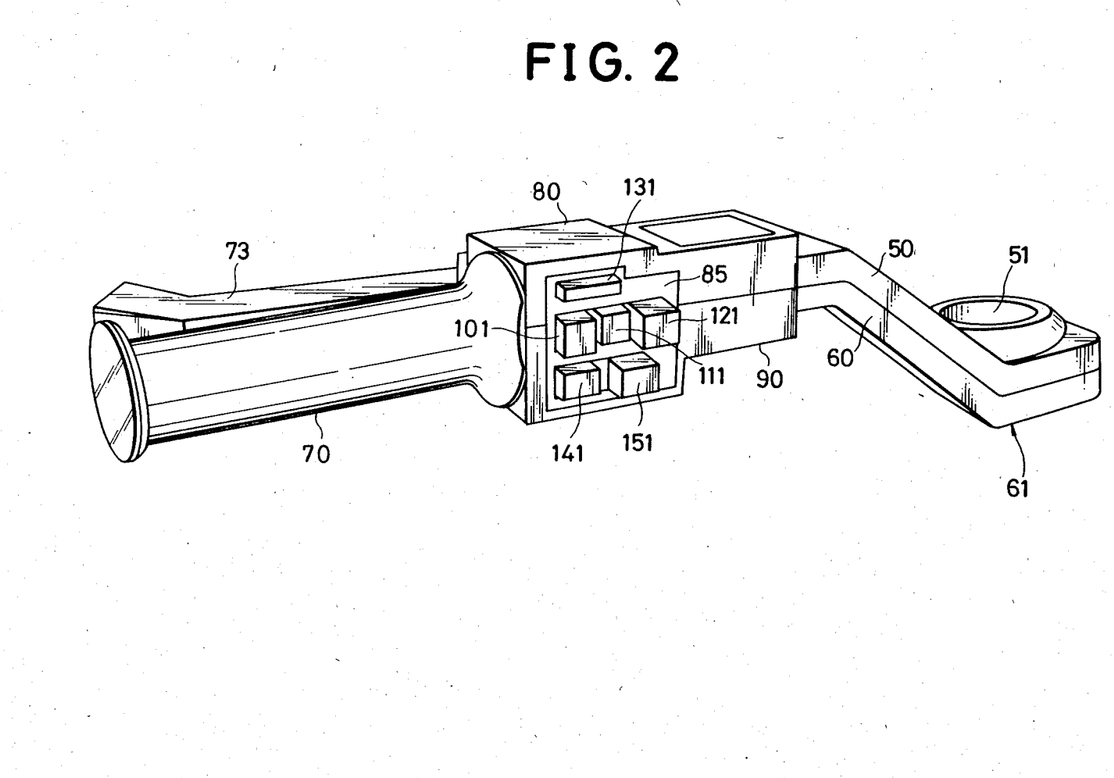
FIG. 2 is a perspective view of a handle switch assembly according to the present invention.
Figure 3:
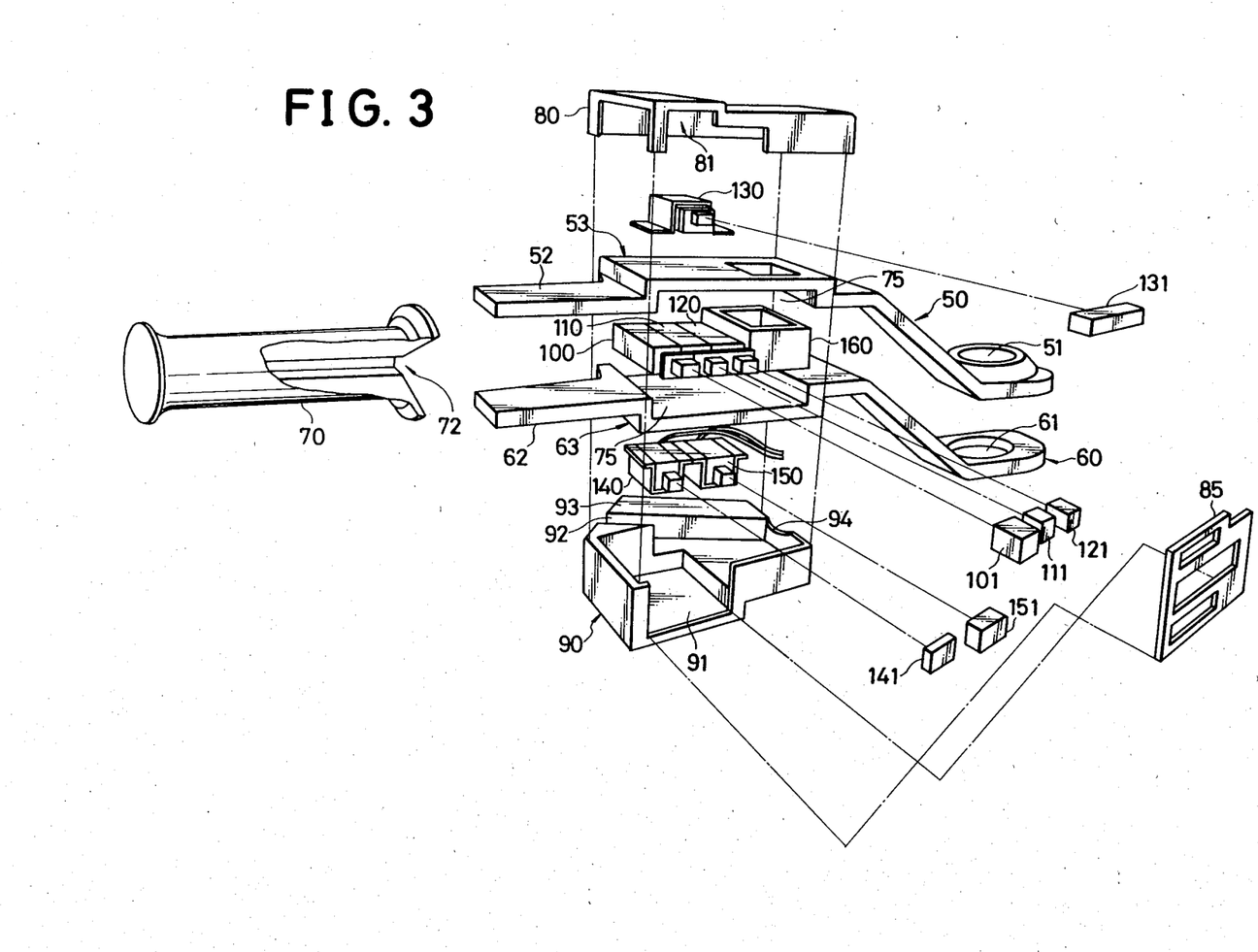
FIG. 3 is an exploded perspective view of the switch assembly shown in FIG. 2.

Referring now to FIGS. 2 and 3, the first embodiment of the handle switch assembly according to the present invention will be explained hereinafter.

As shown in the perspective view of FIG. 2, a pair of elongated plates, i.e., an upper elongated plate 50 and a lower elongated plate 60 are provided so as to make up a handle bar which is to be fixed to a front fork (not shown), when combined together. The upper and lower elongated plates 50 and 60 are formed into a bent shape and openings 51 and 61 are respectively provided at an end portion thereof, as shown in the exploded view of FIG. 3, for the fixation onto the front fork. The upper and lower elongated plates 50 and 60 are also respectively provided with an end of insertion 52 or 62 having a narrower width at the other end thereof. Thus, a handle grip 70 having an insertion opening 72 is securely mounted on the upper and lower elongated plates 50 and 60 acting as the handle member by inserting the ends of insertion 52 and 62 into the insertion opening 72 of the handle grip 70. Furthermore, the upper elongated plate 50 has an upwardly shifted portion 53 at the side of the end of insertion 52 and the lower elongated plate 60 has a downwardly shifted portion 63 corresponding to the upwardly shifted portion 53 at the side of the end of insertion 62, so that a generally rectangular vacant space 75 is formed therebetween. In this vacant space 75, there are disposed three switch elements 100, 110, and 120 for controlling a current of turn signals, and an oil tank 160 for a master cylinder of an oil clutch. More specifically, the switch elements 100, 110, and 120 are disposed side by side and combined together, and for example, the left side element 100 is for a switch for a left turn signal, the central element 110 is for a switch for a right turn signal and the right side element 120 is a reset element. Upon the upwardly shifted portion 53 of the upper elongated plate 50, there is provided an upper housing member 80 for housing a switch element 130 of a dimmer switch. Similarly, beneath the downwardly shifted portion 63 of the lower elongated plate 60, there is provided a lower housing member 90 for housing a pair of switch elements 140 and 150 for a horn switch and for a passing signal switch. The switch elements 100 through 150 are of a known push type switch and are respectively provided with a switch knob or a push button 101 through 151 as a switch operating member. In order to provide access to the switch elements 100 through 150, an opening 81 is provided in a front face of the upper housing member 80 for receiving a control panel 85 having a plurality of openings through which head portions of the push buttons 101 through 105 project. Similarly, an opening 91 is provided in a front face of the lower housing member 90 so that the control panel 85 is placed therein. The lower housing member 90 is also provided with an oil channel 92 which communicates with the oil tank 160 and a holder portion 93 for a clutch lever 73 shown in FIG. 2. A clearance recess 94 for a harness of wires from the switches 100 through 150 is also provided in a side wall of the lower housing member 90.

As it is apparent from the perspective view of FIG. 3, the switch elements are housed in the center of the handle-bar member without any trouble and therefore the disadvantages of the conventional arrangement are completely eliminated in the case of the switch assembly according to the present invention.

Figure 4:
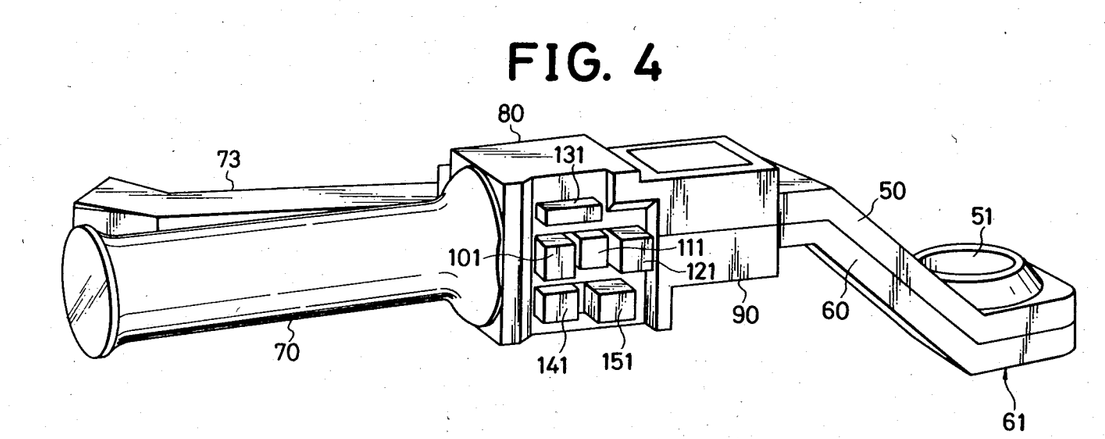
FIG. 4 is a perspective view of a second embodiment of the switch assembly according to the present invention.
Figure 5:
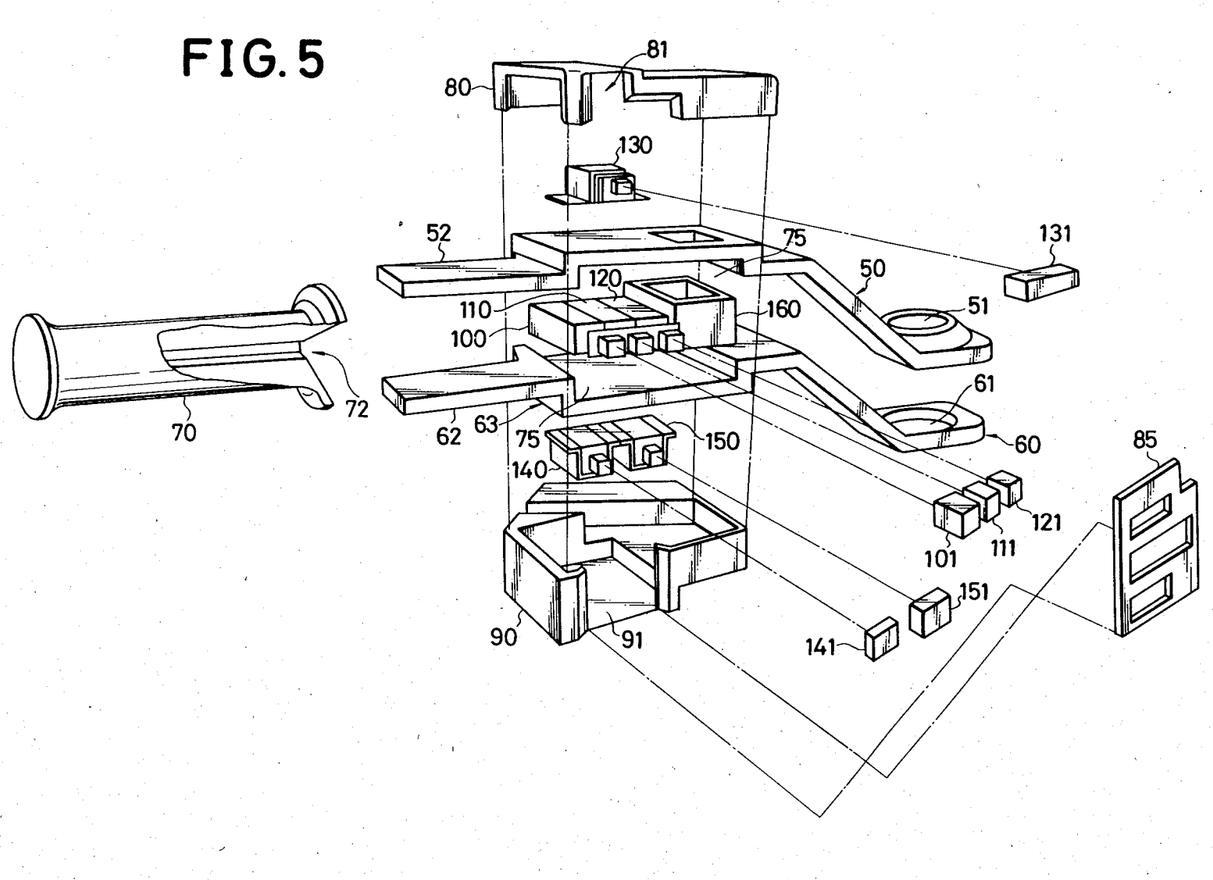
FIG. 5 is an exploded view of the second embodiment of the switch assembly shown in FIG. 4.
Figure 6:
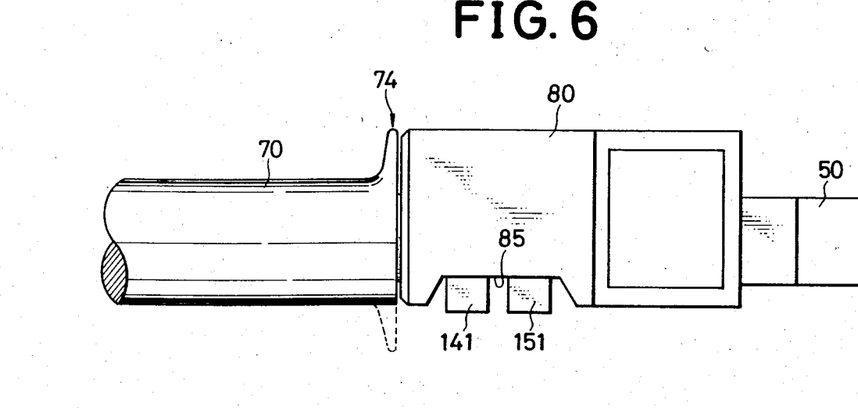
FIG. 6 is a plan view of the second embodiment of the switch assembly shown in FIGS. 4 and 5.

Reference is now made to FIGS. 4 through 6 in which the second embodiment of the handle switch assembly according to the present invention is illustrated. As shown in the perspective view of FIG. 4 and in the exploded view of FIG. 5, this embodiment features that the opening 81 of the upper housing member 80 and the opening 91 of the lower housing member 90 are formed in such a manner that a peripheral edge 86 around the opening 81 and a peripheral edge 96 around the opening 91 are drawn back from the front faces of the upper housing member 80 and of the lower housing member 90.

Figure 7:
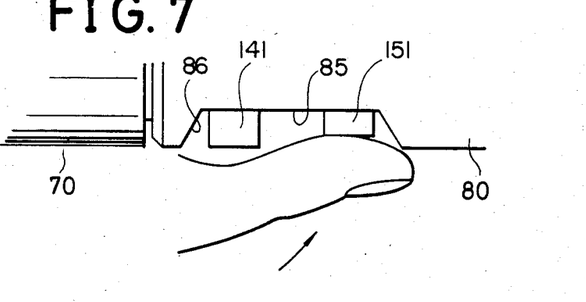
FIGS. 7 and 8 are diagrams showing the manner of pressing the push buttons of the switch assembly shown in FIGS. 4 through 6.
Figure 8:
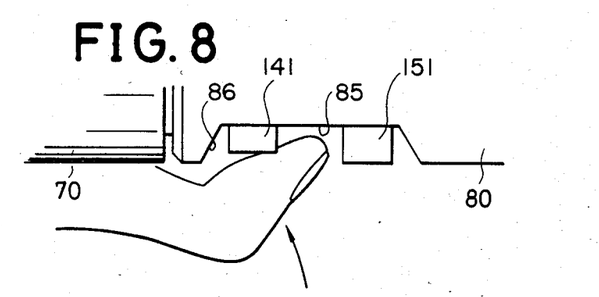

It means that the control panel 85 as well as the switch push buttons 101 through 151 are displaced slightly backward, as clearly shown in the plan view of FIG. 6, as compared with the first embodiment shown in FIGS. 2 and 3. With this arrangement, the handling of the push buttons 101 through 151 can be improved in such a manner as described hereafter. As shown in FIGS. 7 and 8, the push buttons are to be pressed by the bulb of the thumb of an operator while the other fingers of the operator hold the handle grip 70. In order to press the push button of an outer side (further side from the handle grip), it is suitable to move the thumb in an outward direction shown ty the arrow in FIG. 7 for controlling the switch elements more naturally. Similarly, when the push button of an inner side (closer side from the handle grip), it is suitable to move the thumb in an inward direction as shown by the arrow in FIG. 8. In this case, the arrangement of the control panel (displaced slightly backward) is quite advantageous because there is not any risk that the pressing of the push button of the outer side is disturbed by the head portion of the push button of the inner side, which was often the case in a conventional arrangement. Furthermore, the arrangement is advantageous in that the push buttons are protected from being damaged and from being operated unintentionally because of the backwardly displaced arrangement. In addition, in the case of the switch assembly according to the present invention, the handle grip 70 has a flange portion 74 provided with a flat face having the same level as the rear end of a cylindrical surface of the handle grip 70 as clearly shown in FIG. 6. With this provision, the push buttons 101 through 151 can be operated without the problem of touching the flange portion 74. In FIG. 6, the dotted line indicates a flange portion of conventional arrangements.

Figure 9:
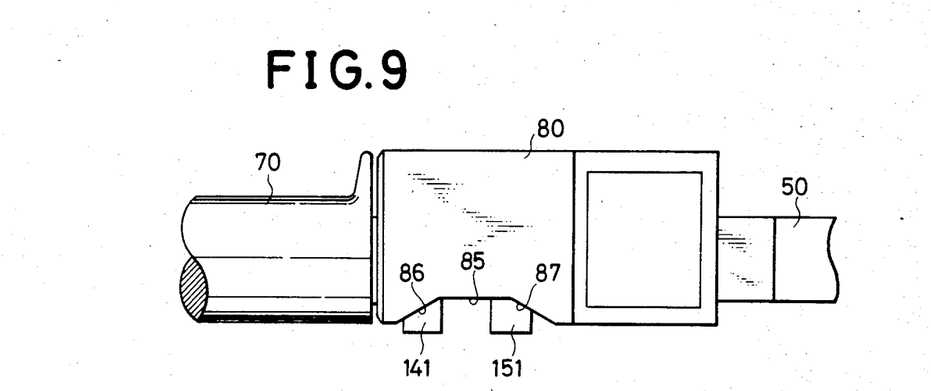
FIG. 9 is a plan view of a modification of the second embodiment of the switch assembly shown in FIGS. 4 through 8.

A further modification of the embodiment is illustrated in FIG. 9. In the case of this modification, the control panel 85 is provided with a pair of slanting portions 86 and 87 at the left and right sides thereof. The provision of the slanting portions 86 and 87 is advantageous since the push buttons are preferably operated by moving the thumb towards the surface of the slanting portions in the same manner as illustrated in FIGS. 7 and 8. Thus, it becomes possible to manipulate the switches more naturally.

Figure 10:
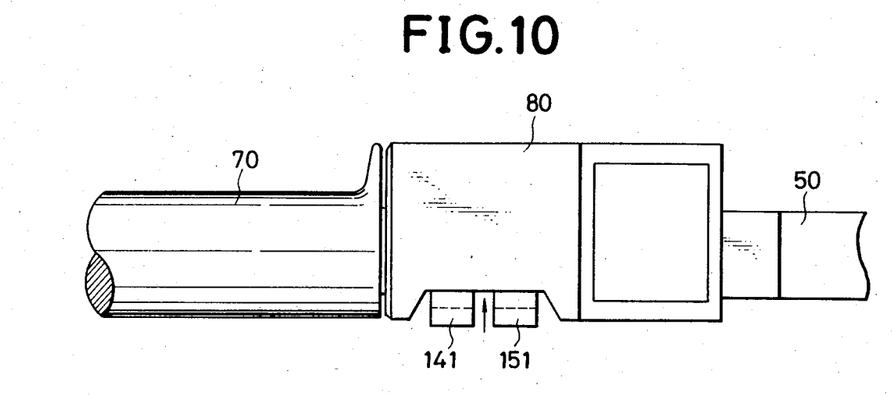
FIG. 10 is a plan view of another modification of the second embodiment of the switch assembly shown in FIGS. 4 through 8.
Figure 11:
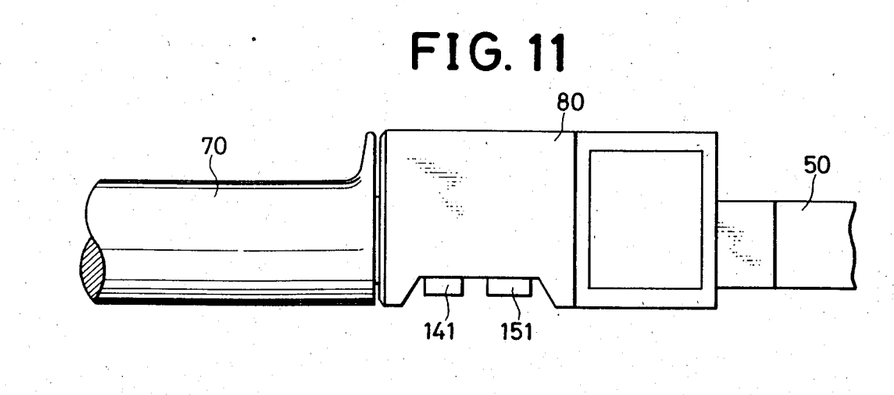
FIG. 11 is a plan view of a further modification of the second embodiment of the switch assembly according to the present invention shown in FIGS. 4 through 8.

Reference is now made to FIGS. 10 and 11, in which further variations of the switch arrangement is illustrated. In the case of the switch assembly shown in FIG. 10, the position of the head portions of the push buttons 141 and 151 (illustrated as an example) are so determined that the head portions are at an outer or prominent side with respect to the level of edges at both sides of the control panel 85 which is the same as the level of the rear end of the handle grip 70, when the push buttons 141 and 151 are at a normal (released) position, and are at an inner or back side with respect to the described level when the push buttons 141 and 151 are pressed-in.

The arrangement shown in FIG. 11 features that the head portions of the push buttons 141 and 151, by way of example, are positioned on or in the inner (back) side of the described level in the normal (released) condition. Further, it is needless to say that the head portions are in the inner side of that level when the push buttons are pressed-in.

It will be appreciated that the operation of the switches is made easier than the conventional arragement in both of the above described variations.

It should be understood that the foregoing description is for illustrative purpose only, and is not intended to limit the scope of the invention. Rather, there are numerous equivalents to the preferred embodiments, and such are intended to be covered by the appended claims.

What is claimed is:

1. A handle switch assembly for a motorcycle having a handle bar with a handle grip mounted at an end thereof, comprising:
   a pair of elongated members oppositely fitted with each other to form said handle bar, said elongated members having mutually opposing portions formed therein bent such as to form a first cavity therebetween near to the end on which the handle grip is mounted, and
   at least a switch element with a switch operating member housed in said first cavity of said elongated members such that the switch element can be actuated by manual operation of the switch operating member from outside of said first cavity.

2. A handle switch assembly as set forth in claim 1, further comprising, at least a housing member mounted on said elongated member at a position on said mutually opposing portions, said housing member being bent such as to form a second cavity between itself and said elongated member contiguously to said first cavity, and at least a switch element with a switch operating member housed in said second cavity such that the switch element can be actuated by manual operation of the switch operating member from outside of the second cavity.

3. A switch assembly as set forth in claim 2, further comprising, a control panel which covers a side of said first and second cavities, and on which said switch operating members are arranged so as to be manually operated.

4. A switch assembly as set forth in claim 3, wherein said control panel is disposed on or behind a substantially vertical plane tangential with a side of a cylindrical surface of said handle grip with respect to a direction of forward movement of said motorcycle.

5. A switch assembly as set forth in claim 4, wherein said switch operating members are disposed such that a head portion of a switch operating member is positioned on or behind said substantially vertical plane when said switch element associated with the switch operating member is actuated.

6. A switch assembly as set forth in claim 4, wherein said switch operating members are disposed such that a head portion of a switch operating member is positioned on or behind said substantially vertical plane when said switch element associated with the switch operating member is turned off.

7. A handle grip for a motorcycle having a handle bar which carries a plurality of switch elements near to the handle grip, comprising, a cylindrical body mounted at an end of the handle bar, a flange portion formed at an inner end of said cylindrical body near to said switch elements, said flange portion having a diameter greater than that of said cylindrical body and provided with a flat face having the same level as the surface of said cylindrical body, so as to provide an easy access to said switch elements.

* * * * *